United States Patent [19]
Sapir

[11] 3,750,128
[45] July 31, 1973

[54] PULSE GENERATOR
[75] Inventor: Said Sapir, Westlake Village, Calif.
[73] Assignee: International Telephone and Telegraph Corporation, New York, N.Y.
[22] Filed: Feb. 7, 1972
[21] Appl. No.: 223,879

[52] U.S. Cl.......... 340/263, 180/105 E, 303/21 CF, 73/518, 324/166, 340/62
[51] Int. Cl. .............................................. G01p 3/48
[58] Field of Search............................. 340/263, 62; 180/105 E; 303/21 CF, 21 CE; 73/518; 307/106, 108; 317/5; 324/166

[56] References Cited
UNITED STATES PATENTS
3,611,813    10/1971    Brocker .................................. 75/518
3,414,335    12/1969    DeCastelet ...................... 303/21 CE
2,762,464    9/1956      Wilcox................................. 340/263

Primary Examiner—Donald J. Yusko
Assistant Examiner—Glen R. Swann, III
Attorney—C. Cornell Remsen, Jr. et al.

[57] ABSTRACT

An electromagnetic pulse generator for use in anti-skid braking systems and in many other applications. A toothed magnetic ring rotates with the wheel of a motor vehicle. A fixed magnetic pickup forms a variable reluctance transformer with the ring. The transformer primary winding is energized with a converted rectangular wave. A differentiator is connected from the rectangular wave generator to a pair of synchronous detectors which receive a common input from the transformer secondary winding. The synchronous detector outputs are impressed on respective flip-flop inputs. The flip-flop output is then a pulse train which is representative of both the position and the velocity of the wheel. One advantage of the pulse generator is that it discriminates against the noise of externally induced voltages, e.g., internal combustion engine firing voltages. Another advantage is that a velocity signal may be obtained at any finite velocity no matter how low. Another advantage of the invention is that it discriminates against noise which is due to vibration that oscillates the ring back and forth toward and away from the pickup or vice versa.

24 Claims, 20 Drawing Figures

PATENTED JUL 31 1973 3,750,128

PULSE GENERATOR

BACKGROUND OF THE INVENTION

This invention relates to the art of position and velocity detection, and more particularly, to a device for producing output pulses representative of the position and/or velocity of a moving member.

The present invention will have many applications and is, therefore, not to be limited to those applications specifically disclosed herein. However, the invention has been found especially useful in detecting the speed of a wheel on a moving vehicle. The invention thus produces output pulses at a pulse repetition frequency (PRF) directly proportional to the wheel velocity. The output pulses may then be utilized in any suitable conventional anti-skid braking system.

In the past, and especially in anti-skid braking systems, the pulse generators for producing pulses at a pulse repetition frequency (PRF) directly proportional to velocity have not operated reliably for several reasons. In the first place, the ignition system of an internal combustion engine used on such vehicles and/or other electromagnetic components such as motors and generators induce voltages in magnetic pickups for such pulse generators. The induced voltages thus create noise. Other noise is created by vibration.

An outstanding solution to the prior art problems just described was made by providing a pulse generator of the type disclosed in copending application Ser. No. 173,459, filed Aug. 20, 1971, by Said Sapir for

NOISE FREE MAGNETIC PICKUP CIRCUIT

Notwithstanding the foregoing, the pulse generator of the said copending application is not operative at very low speeds.

SUMMARY OF THE INVENTION

In accordance with the system of the present invention, the abovedescribed and other disadvantages of the prior art are overcome by providing a pulse generator which produces output pulses for any finite velocity of a moving members no matter how low. The present invention employs an oscillator energized variable reluctance transformer. The transformer has a primary winding and a secondary winding. The transformer and windings are so constructed that induced voltage and vibration noise cancel out. Moreover, by using an oscillator energized transformer, there is now lower velocity limit below which a position change or velocity may not be detected.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
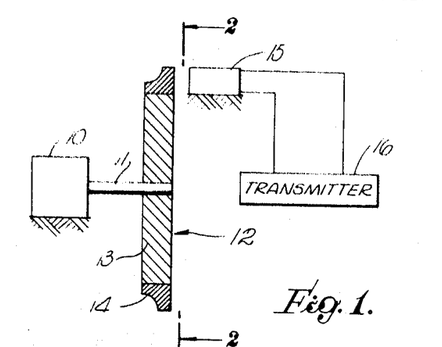
FIG. 1 is a diagrammatic view of a system constructed in accordance with the present invention.

In FIG. 1, any conventional means 10 may be employed to rotate a rotatable output shaft 11 to spin a wheel 12. Wheel 12 includes a disc 13 fixed to shaft 11 and a ring 14 fixed to disc 13. A magnetic pickup 15 is fixed relative to means 10. Ring 14 and pickup 15 form a variable reluctance transformer. A transmitter 16 is connected from pickup 15.

Figure 2:
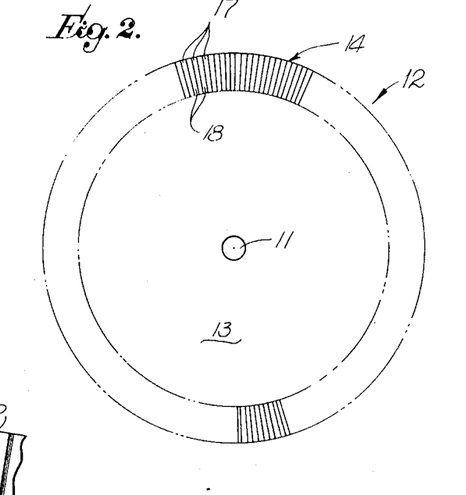
FIG. 2 is an end elevational view of a wheel taken on the line 2—2 shown in FIG. 1.

As shown in FIGS. 1 and 2, wheel 12 is a solid of revolution except for teeth 17 and valleys 18 therebetween. It, of course, need not be a perfect solid of revolution, if desired.

Some dimensions will be given herein. However, it is to be noted that none of the dimensions given herein are by any means critical.

Figure 3:
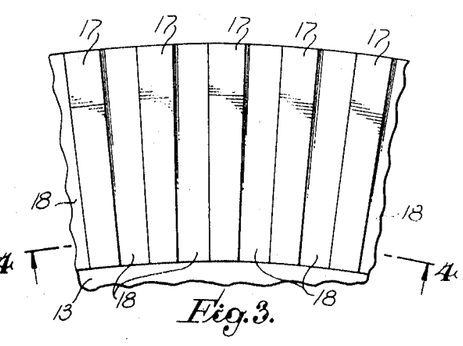
FIG. 3 is an enlarged view of a portion of the wheel shown in FIG. 2.
Figure 4:
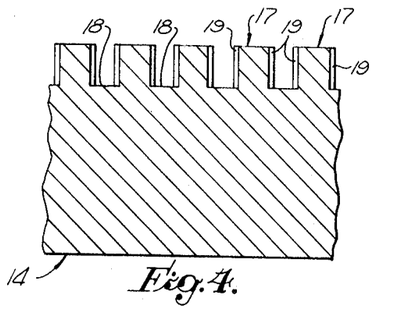
FIG. 4 is a sectional view of the wheel taken on the line 4—4 shown in FIG. 3.

As shown in FIGS. 3 and 4, if desired, the bottom of valleys 19 may be flat, and all of them may be in the same plane. The same is true of the tops of teeth 17. The distance between the bottom of valleys 18 and the tops of teeth 17 may be, for example, one-eighth inch. Teeth 17 thus are otherwise defined between concentric cylindrical surfaces which are the inner and outer cylindrical surfaces or ring 14. Each of the teeth 17 is identical to the other teeth, although, according to the present invention, this is not critical. Each tooth 17 is also defined between two intersecting planes, both planes of which intersect at the axis of shaft 11. Side surfaces 19 of projections 17 lie in the said intersecting planes. The said intersecting planes are disposed at an angle of 1.8°. Ring 14 thus has 200 teeth.

All of the teeth 17 are equally spaced. Further, each tooth has a nominal width equal to the width of each valley. Hence, the two immediately adjacent intersecting planes of two different respectively immediately adjacent teeth intersect at an angle of 1.8°.

In FIG. 4, if desired, the maximum vertical dimension of ring 14 may be 0.75 inch.

Figure 5:
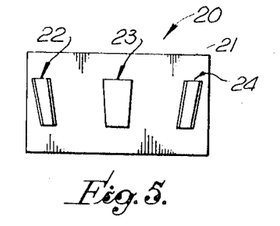
FIG. 5 is a top plan view of a variable reluctance transformer magnetic core.

Ring 14 is made of a magnetic material. The same is true of a core 20 for pickup 15 shown in FIG. 5. Core 20 has a rectangular base portion 21 and projections 22, 23 and 24 fixed to or integral therewith.

Figure 8:
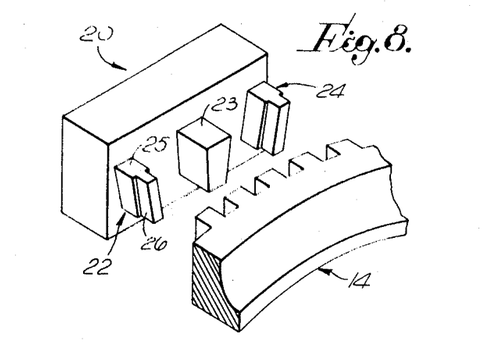
FIG. 8 is a perspective view of the core and a portion of the wheel.

As shown in FIG. 8, projection 22 has a base portion 25 which is wider than an upper portion 26 integral therewith. Upper portion 26 is mounted symmetrically on base portion 25. It has been found that leakage flux is reduced by making portion 26 a few percent narrower than base portion 25. Projection 24 may be identical to projection 22, if desired. However, some small differences will be noted. For example, projections 22 and 24 lean away from projection 23 in FIG. 5. They are disposed at the same angle relative to projection 23 but in one case, the angle is positive and in the other case, it is negative. Base portion 25 may have a width equal to the width of a tooth 17. Projection 23 may have a width equal to twice the width of tooth 17. The spacing of projections 22, 23 and 24 will be explained shortly hereinafter.

Figure 7:
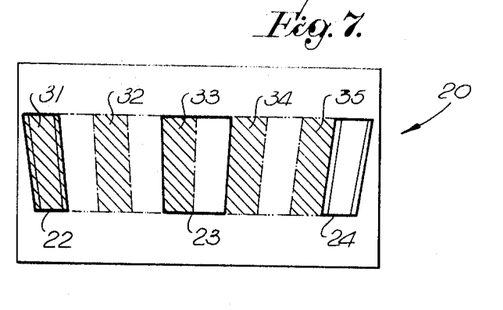
FIG. 7 is an enlarged view the same as FIG. 5 illustrating the location of the teeth and valleys of the wheel shown in FIGS. 1–4, inclusive.

FIG. 7 may be considered to be a scale drawing. Note will be taken that projections 22 and 24 are wedge-shaped (1.8°) but need not necessarily have cylindrical end surfaces conforming exactly to those of teeth 17. The same is true of projection 23, except that its "width" is 3.6°.

Figure 6:
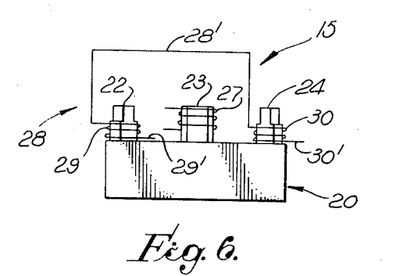
FIG. 6 is a side elevational view of the core shown in FIG. 5 with windings wound thereon.

In FIG. 6, not will be taken that pickup 15 has a primary winding 27 wound about projection 23. Pickup 15 also has a secondary winding 28 including a portion 29 wound about projection 22, and a portion 30 wound about projection 24. Portions 29 and 30 may be identical, if desired. Portions 29 and 30 are connected in voltage bucking relation.

Core 20 is again shown in FIG. 7. The view of FIG. 7 is identical to that of FIG. 5 except for the enlargement and the shaded areas which have been placed thereon to show the relationships of the top surfaces of teeth 17 to the projections 22, 23, and 24. Thus, when a top surface 31 of a tooth 17 registers with or covers projection 22, there is a tooth top surface 32 between projections 22 and 23, a tooth top surface 33 over tooth 23, another tooth top surface 34 immediately adjacent tooth 23, a tooth top surface 35 immediately adjacent projection 24, and no tooth top surface over projection 24.

The view of FIG. 8 demonstrates the orientation of core 20 with ring 14 in one position.

Figure 9:
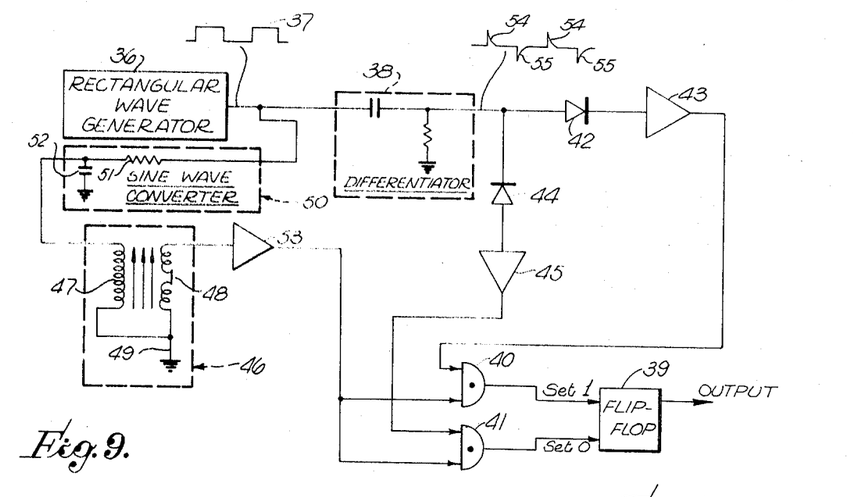
FIG. 9 is a block diagram of the circuit of the present invention.

One circuit of the present invention is shown in FIG. 9. This circuit includes a rectangular wave generator 36 which produces an output waveform 37. Waveform 37 has a pulse width equal to one-half the reciprocal of the PRF thereof. A differentiator 38 is connected from the output of generator 36.

The circuit of FIG. 9 includes a flip-flop 39, the output of which is a pulse train representative of both the position and velocity of ring 14. Flip-flop 39 is set to the "1" state by an output from an AND gate 40. Flip-flop 39 is set to the "0" state by an output from an AND gate 41. AND gate 40 has one input connected from differentiator 38 through a diode 42 and a non-inverting amplifier 43. AND gate 41 has one input from differentiator 38 connected thereto through a diode 44 and an inverting amplifier 45. Amplifiers 43 and 45 may be interchanged. Alternatively, amplifier 43 may be omitted. A variable reluctance transformer 46 is also shown in FIG. 9 including a primary winding 47 and a secondary winding 48. Transformer 46 may be identical to that shown in FIG. 1 including ring 14 and pickup 15. One end of each of the windings 47 and 48 are connected to ground at 49. A since wave converter 50 is connected from the output of generator 36 to the other end of winding 47. Converter 50 includes a resistor 51 connected in series from generator 36 to winding 47, and a capacitor 52 connected in parallel with winding 47. Capacitor 52 and winding 47 forms a tuned circuit which is resonant at the same frequency as the PRF of generator 36. Resistor 51 keeps generator 36 from clamping the primary voltage to its upper and lower levels. Resistor 51 thus permits the tank circuit, including capacitor 52 and primary winding 47, to ring in a sinusoidal fashion.

Secondary 48 is connected to one input of each of the AND gates 40 and 41 through a amplifier 53.

OPERATION OF THE EMBODIMENT OF FIG. 9

In the operation of the embodiment of FIG. 9, generator 36 produces square wave 37 which is impressed across transformer primary 47. However, decoupling is provided by resistor 51; and the tank circuit, including capacitor 52 and primary 47, rings with a sinusoidal voltage that is induced in secondary 48. However, secondary 48 has half portions identical to half portions 29 and 30, shown in FIG. 6, which are connected in bucking relation. The output voltage across secondary 48 is then either in phase or out of phase with the voltage across primary 47. The phase of the secondary voltage is detected by the AND gates 40 and 41. All of the circuit components connected from generator 36 to AND gates 40 and 41 necessarily incur phase shifts. Thus, these components are constructed in a manner such that only the positive spikes 54 at the output of differentiator 38 occur during one-half cycle of waveform 37 and not a crossover. The negative spikes 55 then occur during the other half cycle. As will be explained, the phase of the secondary voltage depends upon the location of the teeth corresponding to the teeth 17 employed in transformer 46.

In accordance with the foregoing, flip-flop 39 will be set to the "1" state when the output of gate 40 is high for one particular phase of the output voltage of secondary 48. Repeated outputs from gate 40 before the next crossover will not cause flip-flop 39 to change states, as is conventional. Only when the phase of output voltage of secondary 48 changes will gate 41 then set flip-flop 39 to the "0" state. The output of flip-flop 39 will then be a pulse train, indicating the position and/or velocity of the ring corresponding to the ring 14 employed in transformer 46.

Figures 10, 16:
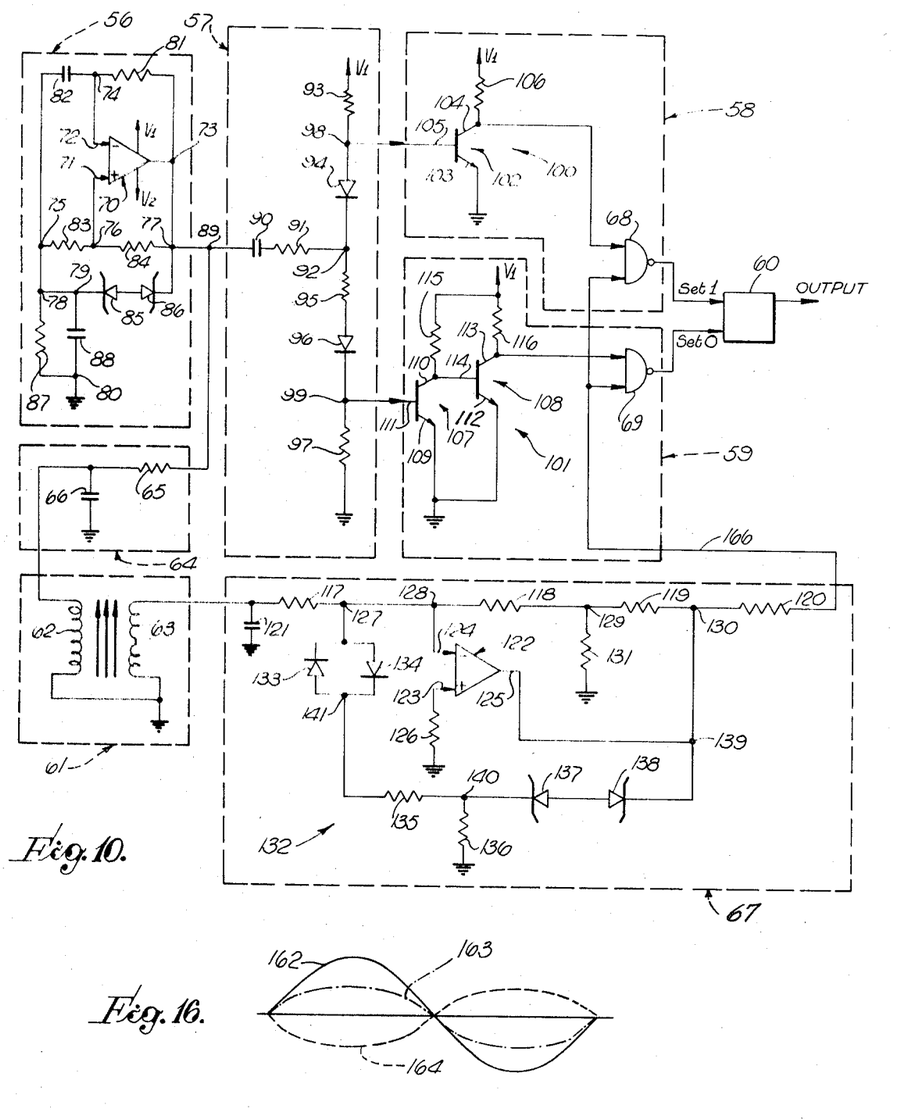
FIG. 10 is a schematic diagram of still another embodiment of the present invention.
FIG. 16 is a graph of voltage waveforms of the variable reluctance transformer winding shown in FIG. 6.

An alternative embodiment of the invention is shown in FIG. 10 including a rectangular wave generator 56. Differentiator means 57 is connected from generator 56 to synchronous detectors 58 and 59, the outputs of which are respectively connected to the set "1" and set "0" inputs of a flip-flop 60.

A variable reluctance transformer 61 is indicated in FIG. 10 which may be identical to variable reluctance transformer 46, shown in FIG. 9. Transformer 61 has a primary winding 62 and a secondary winding 63. A sine wave converter 64 is connected from generator 56 to primary 62, as before. Converter 64 includes a resistor 65 and a capacitor 66, as before. An amplifier 67 is connected from transformer secondary 63 to NAND gates 68 and 69 in detectors 58 and 59, respectively.

Voltages V1 and V2 may be +15 volts and −10 volts, respectively, if desired. However, V1 may be equal to V2, if desired.

In FIG. 10, generator 56 includes an amplifier 70 having plus and minus inputs 71 and 72, respectively, and an output at a junction 73. Other junctions are provided in generator 56 at 74, 75, 76, 77, 78, 79 and 80. junction 80 being grounded. A resistor 81 is connected between junctions 73 and 74. A capacitor 82 is connected between junctions 74 and 75. A resistor 83 is connected between junctions 75 and 76. A resistor 84 is connected between junctions 76 and 77. Zener diodes 85 and 86, poled in opposite directions, are connected in series from junctions 77–79. Junctions 78 and 79 are connected together. A resistor 87 is connected from junction 78 to junction 80. A capacitor 88 is connected from junction 79 to junction 80.

If desired, generator 56 may be entirely conventional. However, diodes 85 and 86 are employed to keep the pulse width equal to one-half the pulse period even through V1 is not equal to V2.

Resistor 65 is connected from the output of generator 56 at a junction 89.

Means 57 includes a capacitor 90 and a resistor 91 connected in that order from junction 89 to a junction 92. A resistor 93 and a diode 94 are connected from V1 to junction 92 in series, in that order. A resistor 95, a diode 96 and a resistor 97 are connected in series, in that order, from junction 92 to ground. Resistor 93 and diode 94 are connected together at a junction 98. Resistor 97 and diode 96 are connected together at a junction 99. Diode 94 is poled to be conductive in a direction toward junction 92. Diode 96 is poled to be conducted in a direction away from junction 92.

In FIG. 10, an inverting amplifier 100 is connected from junction 98 to gate 68. A noninverting amplifier 101 is connected from junction 99 to gate 69.

Amplifier 100 includes a transistor 102 having an emitter 103, a collector 104 and a base 105. Base 105 is connected from junction 98. Emitter 103 is grounded. A resistor 106 is connected from collector 104 to potential V1. Collector 104 is also connected to gate 68.

Amplifier 101 includes transistors 107 and 108. Transistor 107 has an emitter 109, a collector 110 and base 111. Transistor 108 has an emitter 112, a collector 113 and a base 114. Collectors 109 and 112 are connected to ground. Base 111 is connected from junction 99. Base 114 is connected from collector 110. Gate 69 is connected from collector 113. Resistors 115 and 116 are respectively connected from collectors 110 and 113 to potential V1.

In FIG. 10, secondary 63 is connected through a plurality of series connected resistors 117, 118, 119 and 120 to gates 68 and 69. A capacitor 121 is connected in parallel with secondary 63. Capacitor 12 may be considered a part of amplifier 67, or an independent circuit component. Secondary 63 and capacitor 121 form a tuned circuit, as before, which has a resonant frequency which is the same as the PRF of generator 56.

Amplifier 67 includes an operational amplifier 122 having plus and minus inputs 123 and 124, respectively. Amplifier 122 also has an output at 125. A resistor 126 is connected between the plus input 123 of amplifier 122 and ground.

In the series connection of resistors 117, 118, etc., various junctions are made to the same or other portions of the circuit at 127, 128, 129 and 130. The minus input 124 of amplifier 122 is connected to junction 128. A resistor 131 is connected from junction 129 to ground.

The following elements are incorporated in a feedback circuit 132 which acts as a limiter: a diode 133, a diode 134, a resistor 135, a resistor 136, a Zener diode 137 and a Zener diode 138. Zener diodes 137 and 138 are poled in opposite directions in a series circuit from a junction 139 to a junction 140. The output 125 of amplifier 122 and junction 130 are both connected to junction 139. Resistor 136 is connected from junction 140 to ground. Resistor 135 is connected from junction 140 to a junction 141. Diodes 133 and 134 are connected in parallel from junction 141 to junction 127. Diodes 133 and 134 are poled in opposite directions.

If desired, generator 56 and amplifier 67 without capacitor 121 may be entirely conventional. Thus, as described and shown, the embodiment of FIG. 10 is very similar to the embodiment of FIG. 9. Note that in means 57, resistor 95 and diode 96 may be transposed. Thus, the embodiment of FIG. 10 may be identical to the embodiment of FIG. 9 except for means 57 and differentiator 38. Thus, many differentiators or differentiator means may be employed in any number of embodiments of the present invention without departing from the true scope thereof.

As is well known, a NAND gate is simply an AND gate followed by an inverter. NAND gates are employed in FIG. 10 only because of the particular entirely conventional flip-flop 60 which has been selected for use with the embodiment of FIG. 10.

Figure 20:
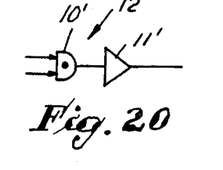
FIG. 20 is a block diagram of a NAND gate.

As is well known and for use herein as well, and AND gate herein may be replaced by a NAND gate with or without an inverter. Conversely, any NAND gate herein may be replaced by an AND gate with or without an inverter. Each AND gate disclosed herein may be any one of several entirely conventional AND gates. Each NAND gate disclosed herein may be any one of several entirely conventional AND gates. Each of the NAND gates 68 and 69 are, in fact, identical to a NAND gate 12' shown in FIG. 20. The NAND gate 12' in FIG. 20 includes an AND gate 10' with an inverter 11' connected therefrom.

In accordance with the foregoing, the general operation of the embodiment of FIG. 10 is the same as that of the embodiment of FIG. 9.

Figure 11:
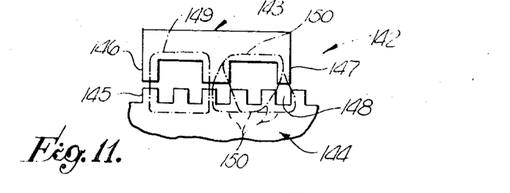
FIG. 11 is a diagrammatic view of the core and wheel illustrating certain magnetic paths.

In order to understand the operation of both of the embodiments of FIGS. 9 and 10, reference may be made to FIG. 11 where a variable reluctance transformer 142 is shown that may diagrammatically represent exactly the same variable reluctance transformer of FIG. 1 including ring 14 and pickup 15. The transformer 142, shown in FIG. 11, is illustrated without windings, for clarity. A core is indicated at 143 in FIG. 11. A ring 144 identical to ring 14 has teeth 145. The views of FIG. 11 and FIG. 12 illustrate how and why the secondary voltage of all of the variable reluctance transformers disclosed herein is either in phase with the primary voltage or 180° out of phase therewith, depending upon the location or ring 144 relative to the stationary core 143.

In FIG. 11, note will be taken that core projection 146 has a width substantially equal to that of tooth 145. When its projection 146 is located directly over a tooth 145, as shown in FIG. 11, the projection 147 at the end of core 143 opposite that on which projection 146 is located is located directly over a valley 148. For this reason, a low reluctance path 149 is created through projection 146. No such low reluctance path is created through projection 147. The combination of a plurality of magnetic paths forming a magnetic circuit and indicated at 150 is not equivalent to the very low reluctance path 149. This means that the voltage induced in the half portion of the secondary wound around projection 146 will be greater than that induced in the half portion of the secondary wound around projection 147. The reverse will be true when projection 147 is located over a tooth, and projection 146 is located over a valley.

Figure 12:
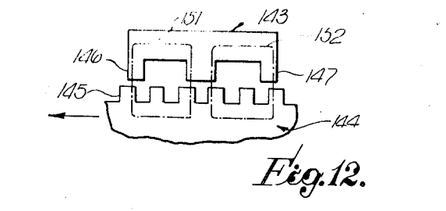
FIG. 12 is a view similar to FIG. 11 showing other magnetic paths.

In FIG. 12, the symmetrical position of core 143 over the teeth 145 of ring 144 causes the reluctances of magnetic paths 151 and 152 through projections 146 and 147, respectively, to be equal. The output voltage of the secondary is then equal to zero because, as stated previously, the half portions of the secondary are connected in voltage bucking relation.

Figure 13:
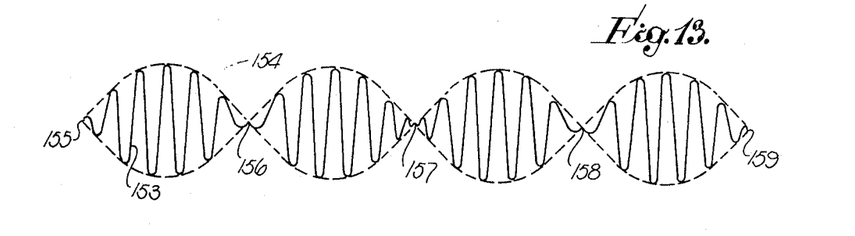
FIG. 13 is a graph of a waveform characteristic of the operation of the embodiments of FIGS. 9 and 10.
Figure 14:
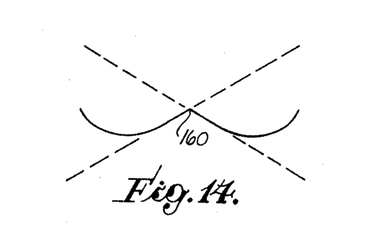
FIGS. 14 and 15 are greatly enlarged portions of the waveform of FIG. 13.
Figure 15:
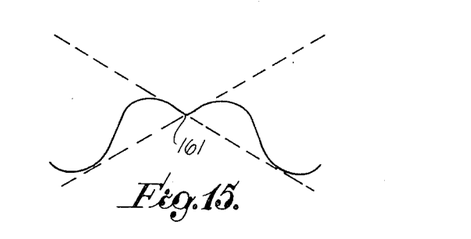

In accordance with the foregoing, if the transformer ring of any of the embodiments disclosed herein is rotated at, for example, a constant velocity, the voltage induced in the transformer primary will have a waveform as indicated at 153 in FIG. 13. It is, more or less, a sine wave amplitude modulated sine wave. Thus, voltage 153 has an envelope 154. An important feature of the invention is that, unlike many amplitude modulated carrier communication systems, voltage 153 is reversed 180 degrees in phase each time this voltage goes through zero at 155, 156, 157, 158 and 159. Moreover, the frequency of voltage 153 is fixed at the PRF of generator 36 or the PRF of generator 56. The envelope frequency is variable with the speed of the transformer ring. The envelope frequency is wholly independent of the frequency of voltage 153. Thus, a 180 degree phase reversal can occur at any time during the phase of voltage 153. Only two of an infinite number of such phase reversals are indicated at zeros 160 and 161, shown in FIGS. 14 and 15, respectively.

Still a better understanding of the mechanism of phase reversal may be had by referring to FIG. 16.

For example, assume that the potential of the end 29' of secondary portion 29 in FIG. 6 varies relative to the potential of point 28' in a manner indicated at 162 in FIG. 16. Then assume that the potential of the end 30' of secondary portion 30 in FIG. 6 varies relative to point 28' in a manner indicated at 163 in FIG. 16. Then, the secondary voltage or the potential of say end 30' relative to end 29' will be as indicated at 164 in FIG. 16. This is true because secondary portions are connected in voltage bucking relation and waveform 162 is thereby effectively subtracted from the waveform 163.

It can be seen that if the amplitude of waveform 163 exceeds that of waveform 162, the phase of waveform 164 will be shifted 180°.

Figure 17:
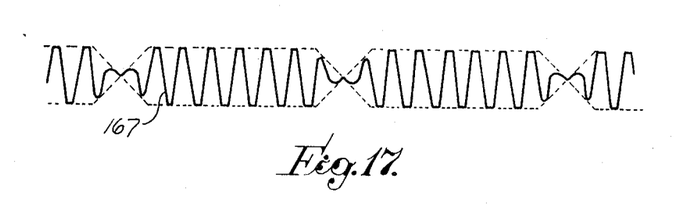
FIG. 17 is a graph of a waveform characteristic of the operation of the circuit of FIG. 10.

The output of amplifier 67 on lead 166 is indicated at 167 in FIG. 17. Note that FIG. 17 may be identical to FIG. 13 with the peaks of the voltage 167 limited.

Figure 18:
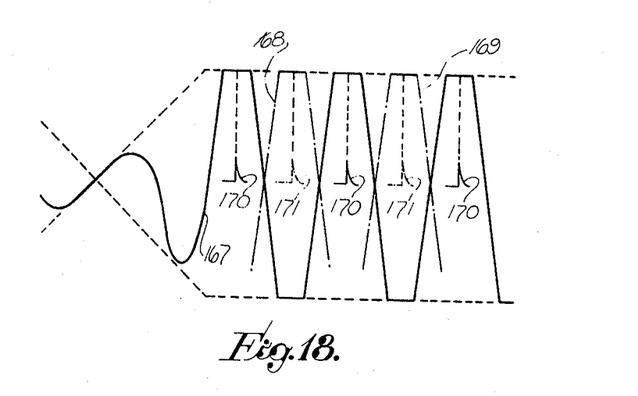
FIGS. 18 and 19 are graphs of other waveforms characteristic of the operation of the embodiment of the invention shown in FIG. 10.

FIG. 18 is an enlarged view of FIG. 17. Voltage 167 occurs for one predetermined phase of the output voltage of the transformer secondary. The other predetermined phase is partially indicated at 168 and 169. Pulses from collector 104 are indicated at 170. Pulses from collector 113 are indicated at 171. Preferably AND gates 40 and 41 and NAND gates 68 and 69 have a relatively high threshold level. For example, all of the gates 40, 41, 68 and 69 may have a threshold of about 7 volts. Thus, the relatively high threshold levels of the gates coupled with the cental location of the pulses 170 and 171 within the peaks of voltage 167, and the peaks 168 and 169 provide for discrimination against malfunctions which can occur because of many phenomena.

Figure 19:
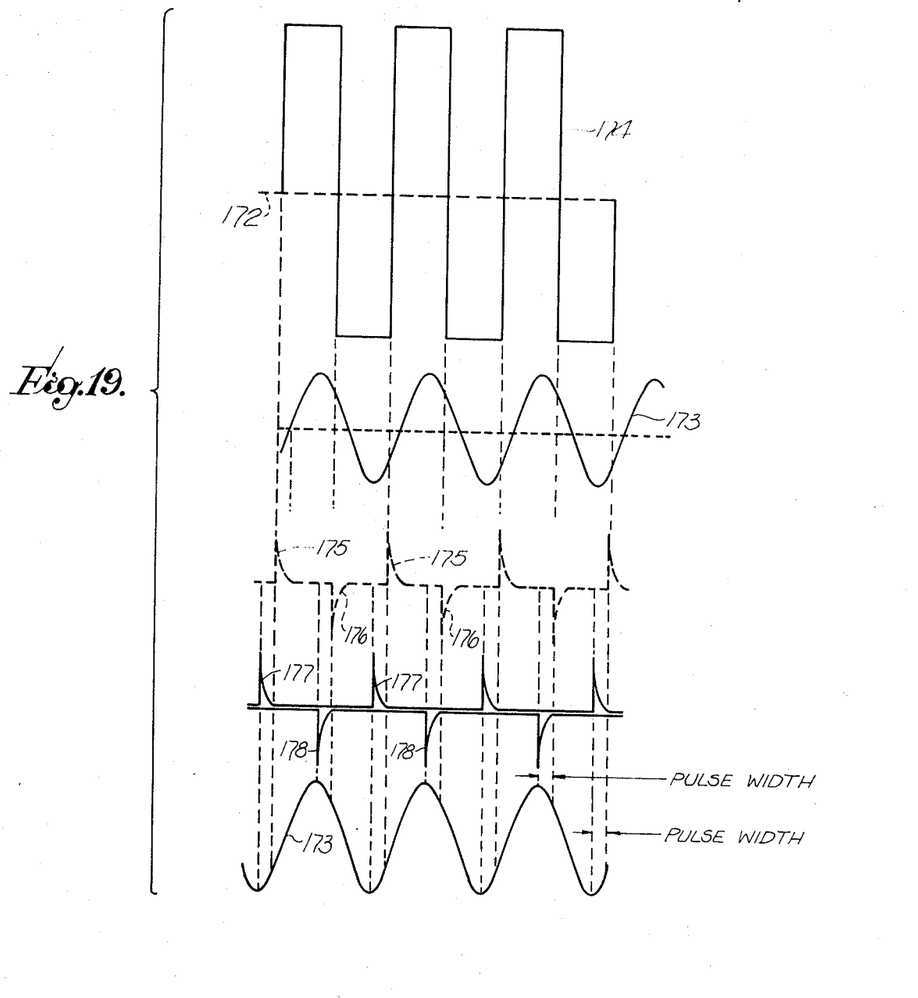

The reasons why that the pulses 170 and 171 occur in the central locations shown in FIG. 18 can be understood from FIG. 19. Line 172 in FIG. 19 represents 0 volts for the output of generator 56 at junction 89 in FIG. 10. The voltage induced in secondary 63 is indicated at 172 in FIG. 19. Note that waveform 173 typically may lag wavefrom 174 at junction 89 by about 45°.

In some cases, resistors 91 and 95 may be shortcircuited and removed. In any event, capacitor 90 with resistors 93 and 97 produce pulses at the crossovers of waveform 174 as indicated at 175 and 176 in FIG. 19. Positive pulses 175 occur at junction 99. Negative pulses 176 occur at junction 98. Thus, positive pulses 177 appear at collector 113, and negative pulses 178 appear at collector 104.

Capacitor 90 not only produces a differentiating action, it also effects a phase advance. Note the first or left hand pulse 175 lags the first or left hand pulse 177, etc. Waveform 173 is again shown at the bottom of FIG. 19. Pulses 178 are thus brought near the peaks of waveform 173. When the phase of waveform 173 is reversed, positive pulses 177 are brought near the peaks of the reversed phase waveform.

The outside diameter of wheel 14 typically may be 8.5 inches.

As shown in FIG. 11, the spacing of projections 146 and 147, center to center, is $9w$, where $w$ is equal to the width of a tooth 145. This spacing may be changed to $w(n+2)$, where $n$ is any positive odd integer. However, $n$ is preferably equal to at least 3, although, if projections 146 and 147 are thinned, a value of $n = 1$ is possible. $n$ preferably equals 7. Note that if $n = 7$, $w(n+2) = 9w$, as before.

The invention is by no means limited to ring 14. Shapes similar to a crown gear, ring gear, bevel gear, synchronous motor rotor or stator with teeth projecting either axially or radially inwardly or outwardly are all possible.

The half portions of the secondary may be wound in directions different from those shown in FIG. 6. It is only necessary that the portions 29 and 30 be connected in voltage bucking relation. The frequency, $f$, of generators 36 and 56 may typically be 25 kilohertz although these generators are by no means limited to this frequency.

The phrase "differentiator means," as used herein and in the claims is hereby defined to include, but not be limited to, one of the following: differentiator means 57 or an equivalent thereof, or differentiator 38 or an equivalent thereof.

As shown in FIG. 19, gating pulses 177 and 178 preferably have a time width which is substantially less than $1/2f$.

What is claimed is:

1. A pulse generator comprising: a base, a member movably mounted on said base; a variable reluctance transformer including a magnetic body fixed relative to said member, said body having a plurality of spaced projections, each pair of immediately adjacent projections being spaced by a groove, said transformer also including a pickup positioned adjacent to said projections, said pickup being fixed relative to said base, said body being constructed and fixed relative to said member in a manner such that movement of said member relative to said base causes movement of said projections past said pickup in a predetermined direction which is normal thereto, said predetermined direction also being approximately perpendicular to the direction in which said grooves run, said pickup including an approximately E-shaped magnetic core having a magnetic cross bar and first, second and third magnetic legs extending from positions contiguous to said cross bar toward a plurality of said projections, said pickup including first, second and third windings around said first, second and third magnetic legs, respectively, all of said legs being fixed relative to said cross bar, each of said legs having an outer end face spaced from said cross bar, said projections being movable in said predetermined direction past the said end faces of all three of said legs in a manner to bring each projection adjacent to each of said end faces in succession, all of said projections having approximately the same size and shape, all of said grooves also having approximately the same size and shape, the width, $w$, of each projection being approximately equal to the width of each groove and vice versa where the projection and groove widths are both measured in said predetermined direction, said second leg being positioned about midway between said first and third legs in said predetermined direction, the said end faces of each of said first and third legs having a width approximately equal to $w$ measured in said predetermined direction, the end face of said second leg having a width approximately equal to $2w$ measured in said predetermined direction, the end faces of said first and third legs being spaced apart in said predetermined direction a distance, $w(n+2)$, where $n$ is any positive odd integer; a rectangular wave oscillator having an output, said oscillator being constructed to produce a rectangular wave of a fundamental frequency, $f$, at said output thereof, said output being connected across said second winding; an output circuit having one input and first and second outputs; first and second NAND gates, each of said NAND gates having first and second inputs and one output; a flip-flop having a set "1" input, a set "0" input and an output, said oscillator output also being connected to said output circuit input, said first and second outputs of said output circuit being connected to said first input of said first and second NAND gates, respectively, the outputs of said first and second NAND gates being respectively connected to said set "1" and set "0" inputs of said flip-flop, each of said first and third windings having first and second ends, the first ends of respective first and third windings being connected together, the connection of said first winding ends causing the voltages induced in said first and third windings to buck each other, said first and third windings being of approximately the same size, one of said winding second ends being connected to a point of qreeference potential, the other of said winding second ends being connected to each of said second inputs to said first and second NAND gates, said output circuit being responsive to said rectangular wave for producing first and second sets of gating pulses at said first and second outputs thereof, respectively, movement of said body causing a comparison signal to be generated at the said other one of said winding second ends which changes from a first predetermined phase to a second predetermined phase 180° therefrom, said first gating pulses always occurring when said comparison signal is of said first predetermined phase and of a polarity to provide an energizing set "1" input to said flip-flop, said second gating pulses always occurring when said comparison signal is of said second predetermined phase and of a polarity to provide an energizing set "0" input to said flip-flop.

2. The invention as defined in claim 1, including a first resistor connected between said oscillator output and one end of said second winding, the other end of said second winding being connected to said point of reference potential, a first capacitor connected in parallel with said second winding, a first amplifier connected from the said other of said winding second ends, said output circuit having an input lead connected from said oscillator, an intermediate junction, a second capacitor and a second resistor connected in series in that order from said input lead to said intermediate junction, a second amplifier having an input and an output, a third amplifier having an input and an output, the outputs from said second and third amplifiers being connected to said first inputs of said first and second gates, respectively, a first diode connected from said intermediate junction to said second amplifier input, a third resistor connected from said second amplifier input to a point of one potential, a second diode connected from said intermediate junction to said third amplifier input, a fourth resistor connected from said third amplifier input to another point of potential, said one point having a potential more positive than the other point, said first diode being poled to be conductive in a direction toward said intermediate junction, said second diode being poled to be conductive in a direction away from said intermediate junction, said second amplifier being an inverting amplifier, said third amplifier being a non-inverting amplifier, $n$ being equal to 7, and a third capacitor connected between said second ends of said first and third windings, said first capacitor and said second winding having constructions which form a tuned circuit that rings at the said frequency, $f$, said third capacitor and said first and third windings having constructions which form a tuned circuit that also rings at the said frequency, $f$, each of said gating pulses being produced approximately at a peak of said comparison signal, each of said gating pulses having a time width less than $1/2f$.

3. The invention as defined in claim 1, wherein $n$ is at least equal to 3, a resistor connected between said oscillator output and one end of said second winding, the other end of said second winding being connected to a point of reference potential, a capacitor connected in parallel with said second winding, and a second capacitor connected between said second ends of said first and third windings.

4. The invention as described in claim 3, including an amplifier connected from the said other of the second ends of said first and third windings to said second inputs of said gates.

5. The invention as defined in claim 1, wherein $n \geq 3$.

6. The invention as defined in claim 1, wherein $n = 7$.

7. The invention as defined in claim 1, wherein each gating pulse is produced approximately at one peak of said comparison signal, each said gating pulse having a time width less than $1/2f$, the gating pulses of one of said sets being produced at the peaks of said comparison signal when said secondary voltage has one of said predetermined phases and not the other, the gating pulses of the other of said sets being produced at the peaks of said comparison signal when said secondary voltage has the other of said predetermined phases and not the said one thereof.

8. A pulse generator comprising: a variable reluctance transformer having a movalbe magnetic circuit, and a primary and secondary, the output voltage across said secondary having one of only two predetermined phases, i.e., in phase or 180° out of phase with the voltage applied to said primary; means including an oscillator for impressing an alternating voltage across said primary; first and second NAND gates, each of said gates having first and second inputs and an output; a flip-flop having a set "1" input, a set "0" input and an output, said second gate inputs both being connected from said secondary; and second means connected from said oscillator, said second means having first and second outputs connected to said first inputs of said first and second gates, respectively, said second means being responsive to the output signal of said oscillator for producing first and second sets of gating pulses at said first and second outputs of said second means, respectively, said pulses of said first set occurring during predetermined alternate periods of 180° of the secondary output voltage, said pulses of said second set occurring during periods between said predetermined periods, the output of one gating being connected to the set "1" input of said flip-flop, the output of the other gate being connected to the set "0" input of said flip-flop.

9. The invention as defined in claim 8, wherein said oscillator is an astable multivibrator, said second means including a first junction and a first capacitor connected from the output of said oscillator to said firt junction, second and third junctions, a first diode connected between said first and second junctions and poled to be conductive in a direction toward said first junction, a second diode connected between said first and third junctions and poled to be conductive in a direction toward said third junction, first and second resistors connected from said second and third junctions, respectively, to first and second points of fixed potentials, respectively, the potential of said first point being more positive than that of said second point, one of said second and third junctions being connected to the first input of said first gate, an inverting amplifier connected from the other of said second and third junctions to the first input of said second gate.

10. The invention as defined in claim 9, including a third resistor connected in series from the output of said oscillator to said transformer primary, a second capacitor connected in parallel with said primary, a third capacitor connected in parallel with said transformer secondary.

11. The invention as defined in claim 10, wherein each gating pulse is produced approximately at one peak of said comparison signal, each said gating pulse having a time width less than $1/2f$, the gating pulses of one of said sets being produced at the peaks of said comparison signal when said secondary voltage has one of said predetermined phases and not the other, the gating pulses of the other of said sets being produced at the peaks of said comparison signal when said secondary voltage has the other of said predetermined phases and not the said one thereof.

12. The invention as defined in claim 11, including a noninverting amplifier connected from the said one of said second and third junctions to the first input of said first gate.

13. The invention as defined in claim 12, including an auxiliary amplifier connected from said secondary to both of said second inputs to said NAND gates.

14. The invention as defined in claim 9, wherein each gating pulse is produced approximately at one peak of said comparison signal, ach said gating pulse having a time width less than $1/2f$, the gating pulses of one of said sets being produced at the peaks of said comparison signal when said secondary voltage has one of said predetermined phases and not the other, the gating pulses of the other of said sets being produced at the peaks of said comparison signal when said secondary voltage has the other of said predetermined phases and not the said one thereof.

15. The invention as defined in claim 14, including a noninverting amplifier connected from the said one of said second and third junctions to the first input of said first gate.

16. The invention as defined in claim 8, including a third resistor connected in series from the output of said oscillator to said transformer primary, a second capacitor connected in parallel with said primary, a third capacitor connected in parallel with said transformer secondary.

17. The invention as defined in claim 16, wherein each gating pulse is produced approximately at one peak of said comparison signal, each said gating pulse having a time width less than $1/2f$, the gating pulses of one of said sets being produced at the peaks of said comparison signal when said secondary voltage has one of said predetermined phases and not the other, the gating pulses of the other of said sets being produced at the peaks of said comparison signal when said secondary voltage has the other of said predetermined phases and not the said one thereof.

18. The invention as defined in claim 8, wherein each gating pulse is produced approximately at one peak of said comparison signal, each said gating pulse having a time width less than $1/2f$, the gating pulses of one of said sets being produced at the peaks of said comparison signal when said secondary voltage has one of said predetermined phases and not the other, the gating pulses of the other of said sets being produced at the peaks of said comparison signal when said secondary voltage has the other of said predetermined phases and not the said one thereof.

19. The invention as defined in claim 9, including a noninverting amplifier connected from the said one of said second and third junctions to the first input of said first gate.

20. The invention as defined in claim 10, including a noninverting amplifier connected from the said one of said second and third junctions to the first input of said first gate.

21. A pulse generator comprising: a base; a member movable on said base; a variable reluctance transformer having a magnetic circuit including a first portion fixed relative to said base and a second portion adjacent thereto fixed relative to said member; said transformer including a primary and a secondary wound on said magnetic circuit first portion; a rectangular wave generator having an output connected to said primary to impress pulses thereon, said transformer being constructed in a manner such that responsive to the position of said member and the application of said generator output to said primary, said secondary has an output voltage which has only one of first and second phases, the difference in time between said first and second phases always being $1/2f$, where f is the pulse repetition frequency of the output pulses of said genertor; differentiator means connected from said generator and having first and second output leads, said differentiator means producing output pulses on said output leads thereof which, if combined, would be the complete derivative of the square wave output of said generator, only positive pulses being produced on said first output lead of said differentiator means, only negative pulses being produced on said second output lead of said differentiator means; a flip-flop having a set "1" input, a set "0" input and an output; and first and second synchronous detectors connected from said differentiator means first and second output leads, respectively, to said set "1" and set "0" inputs of said flip-flop, respectively, both of said detectors also being connected from said transformer secondary.

22. The invention as defined in claim 21, wherein said differentiator means includes a first junction connected to said generator output, and second, third and fourth junctions, said third and fourth junctions being connected to said first and second detectors, respectively, a capacitor connected between said first and second junctions, a series circuit including a first diode connected between said second and third junctions, a second diode connected between said second and fourth junctions, first and second resistors connected from said third and fourth junctions, respectively, to first and second points of reference potential, respectively, the potential of said second point being more positive than that of said first point, said third and fourth junctions being connected to said differentiator means first and second output leads, respectively, said first diode being poled to be conductive in a direction away from said secomd junction, said second diode being poled to be conductive in a direction toward said second junction.

23. The invention as defined in claim 22, wherein said capacitor has one electrode connected from said first junction, and another electrode, a third resistor connected between said other capacitor electrode and said second junction, said series circuit including a fourth resistor and said first diode connected in series between said second and third junctions.

24. A pulse generator comprising: a base; a member movable on said base, a variable reluctance transformer having a magnetic circuit including a first portion fixed relative to said base and a second portion adjacent thereto fixed relative to said member, said transformer including a primary and a secondary wound on said magnetic circuit first portion; an oscillator having its output connected to said primary, said first magnetic circuit portion including three projections, said primary being wound on one of said projections, each of said secondary portions being wound upon the corresponding other ones of said projections, said secondary portions being connected in voltage bucking relation; and means connected from said oscillator and said secondary to produce output pulses at alternate times that the phase of the voltage across said secondary changes.

* * * * *